J. A. WHITFORD.
Car Truck.
No. 1,931.
Patented Jan. 20, 1841.
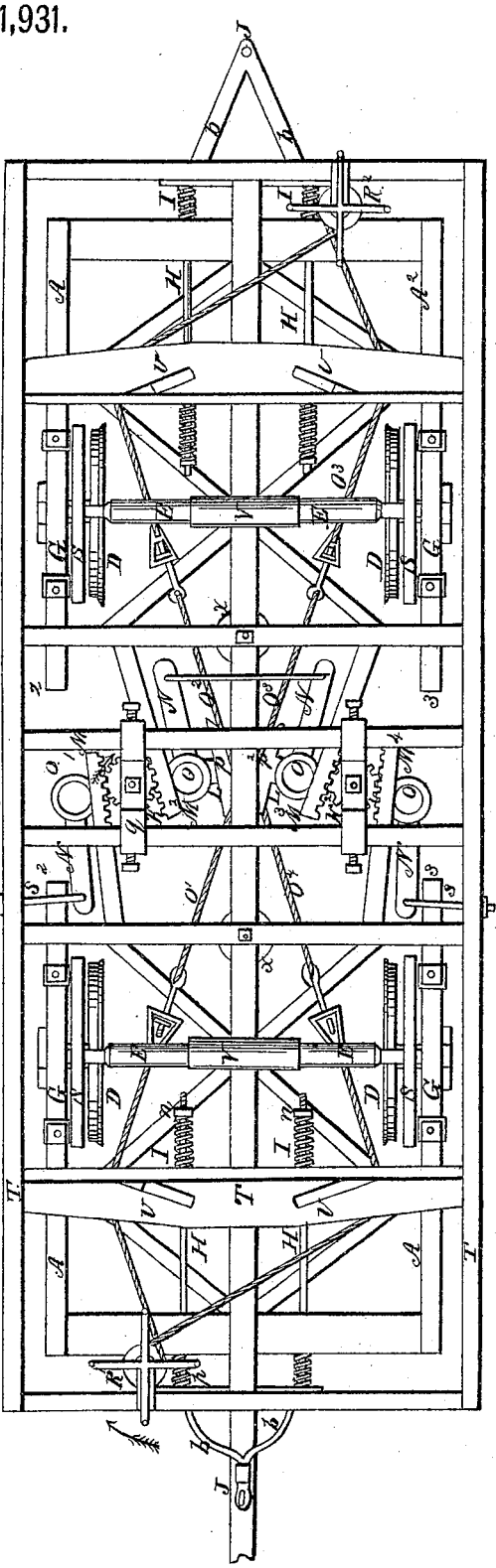
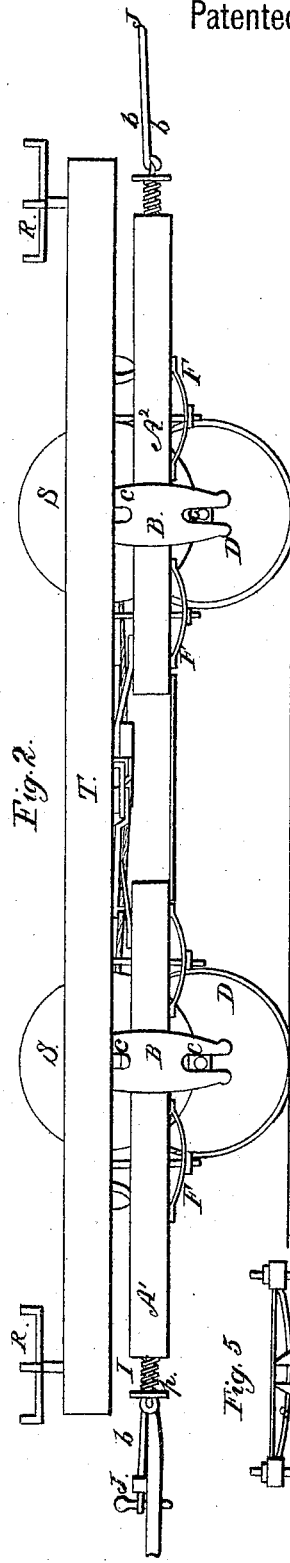
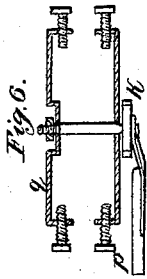
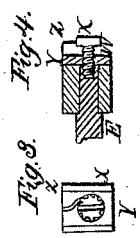
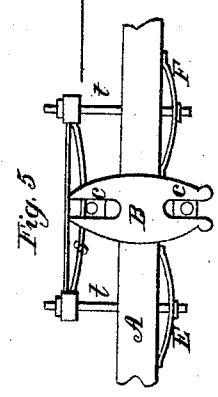

UNITED STATES PATENT OFFICE.

JOHN A. WHITFORD, OF SARATOGA SPRINGS, NEW YORK.

CAR FOR RAIL AND OTHER ROADS.

Specification of Letters Patent No. 1,931, dated January 20, 1841.

*To all whom it may concern:*

Be it known that I, JOHN A. WHITFORD, of the village of Saratoga Springs, in the county of Saratoga and State of New York, have invented new and useful Improvements in Cars for Rail and other Roads, which are described as follows, reference being had to the annexed drawings of the same, making part of this specification.

Figure 1 is a plan of the car; Fig. 2, side elevation; Fig. 3, section showing the adjustable apparatus of the axles E; Fig. 5, section showing the connection of the springs; Fig. 6, vertical section through the horizontal adjustable plates.

Similar letters refer to similar parts in the figures.

The two truck frames $A^1$ $A^2$ are made in the usual manner. The pedestals B, boxes C, and wheels D are also made like others in use. The improvements are in the axles E, mode of adjusting them to the boxes C as they wear, arrangement of additional springs E, in combination with the main springs G of the upper boxes; arrangement of rods H and spiral springs I and couplings J to connect the cars and prevent the jar in starting and stopping, arrangement of pinions K, arms L, cogged bars M, levers N, with antifriction wheels O, segments P, chains Q and windlasses R for turning and guiding the cars, arrangement of anti-friction wheels S turning on the axles E of the main or flanged wheels D, the axles of which anti-friction wheels S turning in the upper boxes of the pedestals B, arrangement of spring dogs for holding the windlasses.

The upper or main frame T for coupling the two small or truck frames $A^1$ $A^2$ which forms the lower part of the car body is made in the usual manner except in the arrangement of the anti-friction wheels U, which turn on plates on the truck frames A for facilitating the turning of the cars.

The axles E of the flanged wheels are divided in the center to prevent twisting in turning curves and are coupled by a tube V slipped over them and in which the inner ends of the axle turn being supplied with oil through an aperture in the said tube closed by a screw stopper. The axles are adjusted to the boxes horizontally by means of screws W, see Fig. 4, with round or convex points which enter cavities in the ends of the axles E; which screws pass through nuts in dovetailed slides Y in the boxes and when turned in order to tighten the axles, are held in the required position by means of dogs Z fastened to the slides and dropping into ratchet wheels X fixed on the ends of the screws W outside the boxes. The additional springs F are arranged on the under sides of the truck frames $A^1$ $A^2$ on either side of the pedestals B through which springs F the bolts *t* of the main springs *s* pass vertically having first passed through the sides of the truck frames, see Fig. 5. The main springs *s* are fixed to the boxes of the axles of the anti-friction wheels S which boxes slide in the upper part of the pedestals B directly over the boxes of the divided axle of the flanged wheels D. The anti-friction wheels *s* above mentioned are in diameter about equal to the diameter of the flanged wheels D and their peripheries turn upon the axles E of the latter on the outside thereof or upon the peripheries of small wheels fixed to them.

Two parallel rods H connected at their outer extremities by a cross plate *p* passing horizontally through the two forward cross bars of the truck frames A having spiral springs I coiled around them between said plate and the outer or end cross bar of the truck frame; and other spiral springs are coiled around said rods near their inner extremities between nuts *n* screwed on them and the inner cross bar so that in starting the car these springs are contracted and in stopping suddenly the other springs are contracted. To the outer extremities of the parallel rods H are attached bars *b* which are united at J by a ring staple or otherwise forming a bow or triangle for attaching the cars together.

Two pinions *k* are fixed to two vertical axles passed through parallel horizontal adjustable plates (*v*) attached to the car frame having the lower extremities of said axles fixed in the ends of horizontal arms or levers L to which arms are fixed segments $P^1$ $P^2$ of wheels, grooved on their convex sides to which are attached chains Q leading around pulleys and from thence to windlasses $R^1$ $R^2$ at either end of the car around which they pass for turning the cars which is effected by said pinions being made to engage with four cogged bars M attached to the truck frame A two to each and one on each side of each pinion. The said cogged bars are attached to the truck frames by screws or bolts passing through them into said frames and on which they move. They are kept in gear with the pinions by means of rollers O turning against the backs of the same having vertical axles which turn in the ends of horizontal bars N which move on bolts inserted into the under side of the car which levers are coupled together at the longer ends or otherwise as preferred; or made adjustable by screw bolts S.
The horizontal plates for the anti-friction rollers U to turn on are made in the form of a segment of a circle and are fastened upon the tops of the trucks. The anti-friction wheels U which move over these plates are placed in openings in the car body and turn on axles inserted therein.

The spring dog for holding the windlass is put into gear by pressing the foot upon a lever or in any convenient manner.
By omitting the flanges of the truck wheels the car may be adapted for traveling over common macadamized roads.

Operation: In order to turn the car by means of the windlass R' the attendant turns the windlass which winds one chain while it unwinds the other Q² of the other windlass R², causing the segments P', P² to move in contrary directions and consequently to turn the pinions K' K² in a similar manner which moves the racks or cogged bars M' M² M³ M⁴ in opposite directions at the same time being kept constantly in gear with the pinions thus causing the two truck wheels D on one side to approach each other while those on the opposite side recede or leave each other in turning a curve. In order to make the operation more clear—suppose the windlass R' should be turned in the direction of the arrow, it will wind the chain Q' of the windlass R², and at the same time the chain Q³ will be wound on windlass R² and the chain Q⁴ will be unwound from windlass R' thus causing the segment P' to move in a contrary direction or toward pinions K' K² in contrary directions and the cogged bars M' M³ to move to the right and the cogged bars M² M⁴ to move in contrary directions, or to the left, which will cause the corners 2, 2 of the trucks to approach each other and the corners 3, 3 to recede from each other and thus cause the car to turn to the right. And in turning to the left the motion of the aforementioned parts must be reversed. Each truck turns on a single vertical bolt $x$ which passes down through the car frame T and through the inner cross bar of the truck A' A² by which they are also connected together and by which the turning is made extremely easy. The same operation takes place when the locomotive effects the turning without the use of the windlass extending throughout the whole train.

What I claim as my invention and which I desire to secure by Letters Patent is—

1. The combination and arrangement of the pinions K, cogged bars M, arms L, segments P, chains Q, and windlasses R, for turning and guiding the cars as described.

2. The mode of coupling the divided axle E by means of the tube V in combination with the mode of adjusting the same by means of the screws, ratchet wheels, pawls and slides as described.

3. The arrangement of the springs F in combination with the bolts $t$ and spring $s$ as described.

JOHN A. WHITFORD.

Witnesses:
WM. P. ELLIOTT,
E. MAHER.